Jan. 25, 1966 S. LEHRER 3,231,002
PULSED CHAMBER PRESSURIZATION SYSTEM
Filed Jan. 11, 1962
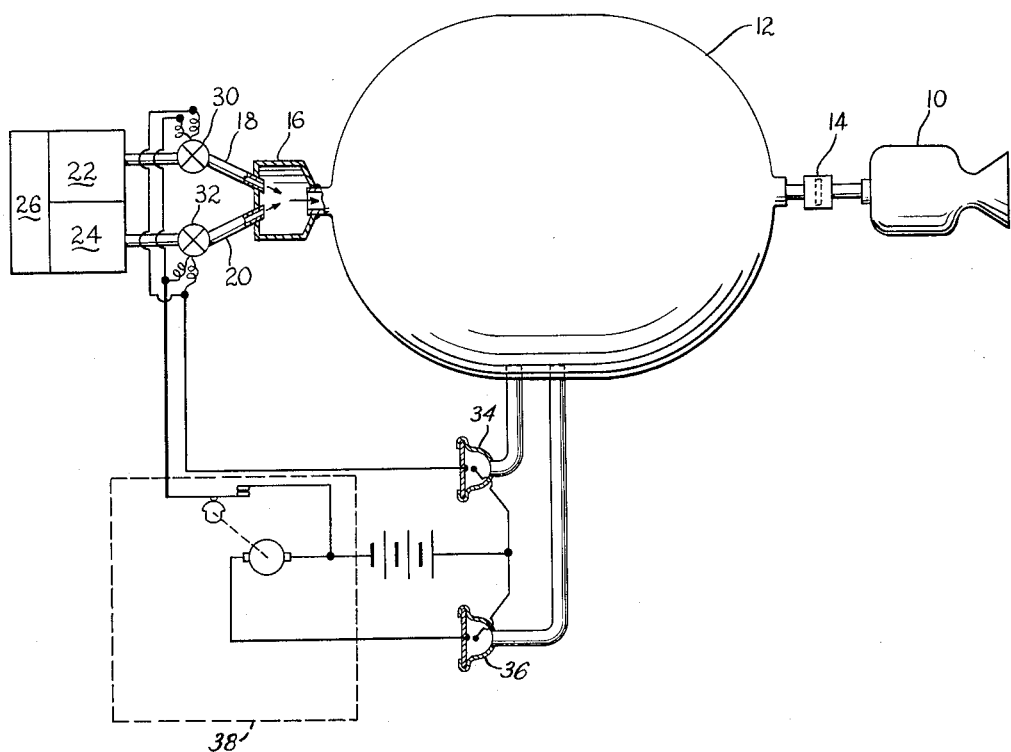
INVENTOR.
STANLEY LEHRER
BY
AGENT 3,231,002
PULSED CHAMBER PRESSURIZATION SYSTEM
Stanley Lehrer, Pompton Lakes, N.J., assignor to Thiokol Chemical Corporation, Bristol, Pa., a corporation of Delaware
Filed Jan. 11, 1962, Ser. No. 165,502
1 Claim. (Cl. 158—36.5)

This invention relates generally to liquid propellant reaction motors and more particularly to a novel means of pressurizing the liquid propellant for delivery to the combustion chamber of the motor.

Various methods for supplying propellants to combustion chambers of reaction motors are known in the art. One such method is to conduct an inert gas under pressure to propellant supply tanks to thus pressurize their contents to force them to the combustion chamber but this involves heavy and bulky gas tankage which is undesirable in air vehicles. Another method of pressurizing propellants by inert gases recognized that the gas feeding pressures must be carefully controlled but involved the use of complex inefficient and impractical control means which proved unreliable in operation.

The main object of the present invention is to provide an improved pressurizing system for liquid propellant tankage of reaction motors which will be simple and reliable in operation and embody low system weight.

An important object of the present invention is to provide an improved pressurizing system for liquid propellant tankage of reaction motors in which a pulsed, is directly pressurized by the gases from the combustion of liquid propellant charge in a gas generator.

Another important object of the present invention is to provide an improved pressurization system for liquid propellant tankage of reaction motors in which a plused, hypergolic bipropellant combustion chamber or gas generator is connected to the propellant tankage for direct pressurization of the contents thereof.

A further important object of the present invention is to provide extremely accurate controls for the flow of pressurizing gas to the propellant tankage.

Other objects and advantages of the present invention will become apparent during the course of the following description.

In the drawings I have shown one embodiment of the invention. In this showing:

The single figure is a schematic view of the pressurizing system comprising the present invention.

Referring to the drawings, numeral 10 designates the combustion chamber of a reaction motor which receives propellant for combustion therein from propellant tankage 12 by a conduit including a check valve 14 when pressurized by the system of the present invention. While a single tank and conduit for a monopropellant have been shown, it will be appreciated that the tankage may comprise a plurality of tanks for fuel and oxidizer.

A gas generator 16 is directly connected to the tankage 12 so that the monopropellant therein may be directly pressurized by the hypergolic bipropellant gases formed in and issuing from the generator. The fuel and oxidizer forming the bipropellants for the generator 16 are fed thereto by conduits 18 and 20 from a set of small tanks 22 and 24 which may be pressurized as shown schematically at 26 by inert gas.

The flow of the hypergolic propellants through the conduits 18 and 20 to the gas generator 16 is controlled respectively by valves 30 and 32 which are electrically actuated by a signal from high and low pressure setting switches 34 and 36 positioned in the tankage or monopropellant tank 12.

It will be apparent that when the pressure in the tankage reaches a set value, it will actuate the high level pressure switch 34 to open the electrical circuit and effect a closing of the spring biased valves 30 and 32. Conversely, when the pressure in the tankage drops or reaches a set minimum, the high level pressure switch 34 and the low level pressure switch 36 will be actuated to effect an opening of the valves 30 and 32 to permit the flow of pressurized hypergolic propellants to the gas generator 16 and thereby provide a flow of pressurizing gas to the monopropellant in the tank 12.

A very fine control of pressurizing gas flow is provided by a pulse timer 38 inserted in the electrical circuit of the valves 30, 32 and pressure responsive switches 34, 36. This enables the pulsing of the gas generator 16 even if it is of a relatively large capacity, during the time the low level pressure switch 36 is actuated to start the flow of the bipropellants to the gas generator. Upon such actuation, the pulse timer 38 is actuated to provide a pulsed control signal to the flow control valves 30, 32.

For each second of time that the low level pressure switch is actuated to effect the flow of pressurizing gas, the pulse timer 38 provides a 10 cycle per second signal to the gas generator control valves which effects a .040 second flow time and burning of the hypergolic bipropellant and an .060 second shut off time in each cycle or pulse. This will provide a pressurizing gas flow at approximately 40% of the rated capacity of the generator 16.

Similarly, a 10 cycle per second signal calling for .020 second propellant flow time and a .080 second shut off time will provide a propellant and generated gas flow time of approximately 20% of the rated capacity of the generator 16. At 5 cycles per second, a .020 second flow time and .080 second shut off time duty cycle will provide a pressurizing gas flow equal to only 10% of the rated capacity of the gas generator.

It will now be readily apparent that the system described makes available a wide range of pressurizing gas flow capacity from a single gas generator size in accordance with the nature of the pulse duty cycle when gas flow is demanded.

It is to be understood that the form of the invention herewith shown and described is to be taken as a preferred example of the same and that various changes in the shape, size and arrangement of parts may be resorted to without departing from the spirit of the invention or the scope of the subjoined claim.

What I claim is:
A system for pressurizing propellant tankage for effecting flow of propellant therefrom to a combustion chamber comprising, in combination, propellant tankage; a gas generator communicating directly with said tankage; a source of pressurized hypergolic propellants; means for conducting said hypergolic propellants to said generator for combustion therein and the generation of gases to pressurize the propellant in said tankage; said conducting means including flow control valves connected to provide substantially constant flows for the entire duration of the time the valves are open; means responsive to a signal pulse to open the valves for the duration of such signal pulse; and means providing the last-mentioned means with such a signal pulse repetitively at a uniform rate and having a predetermined pulse duration when the pressure in the propellant tankage falls below a predetermined low pressure.

References Cited by the Examiner
UNITED STATES PATENTS

| | | | |
|---|---|---|---|
| 2,394,852 | 2/1946 | Goddard | 158—50.1 X |
| 2,858,672 | 11/1958 | Clark | 60—39.48 X |
| 2,940,256 | 6/1960 | Conyers et al. | 60—39.48 |
| 2,943,673 | 7/1960 | Hickman | 158—28 |
| 2,950,867 | 8/1960 | Hawley. | |
| 2,979,891 | 4/1961 | Widell | 60—39.28 X |
| 3,029,598 | 4/1962 | Saltarelli et al. | 60—39.48 X |
| 3,048,969 | 8/1962 | Horner | 60—35.6 |
| 3,088,406 | 5/1963 | Horner | 60—39.6 |

FREDERICK L. MATTESON, JR., *Primary Examiner.*

PERCY L. PATRICK, JAMES W. WESTHAVER, ROBERT A. O'LEARY, *Examiners.*